(No Model.)  2 Sheets—Sheet 1.

W. R. BOERNER.
WIRE WORK.

No. 312,701. Patented Feb. 24, 1885.

Witnesses
L. Holmboe
J. Lomm

Inventor
Winibald R. Boerner
By Pin & Fisher
His Attorneys

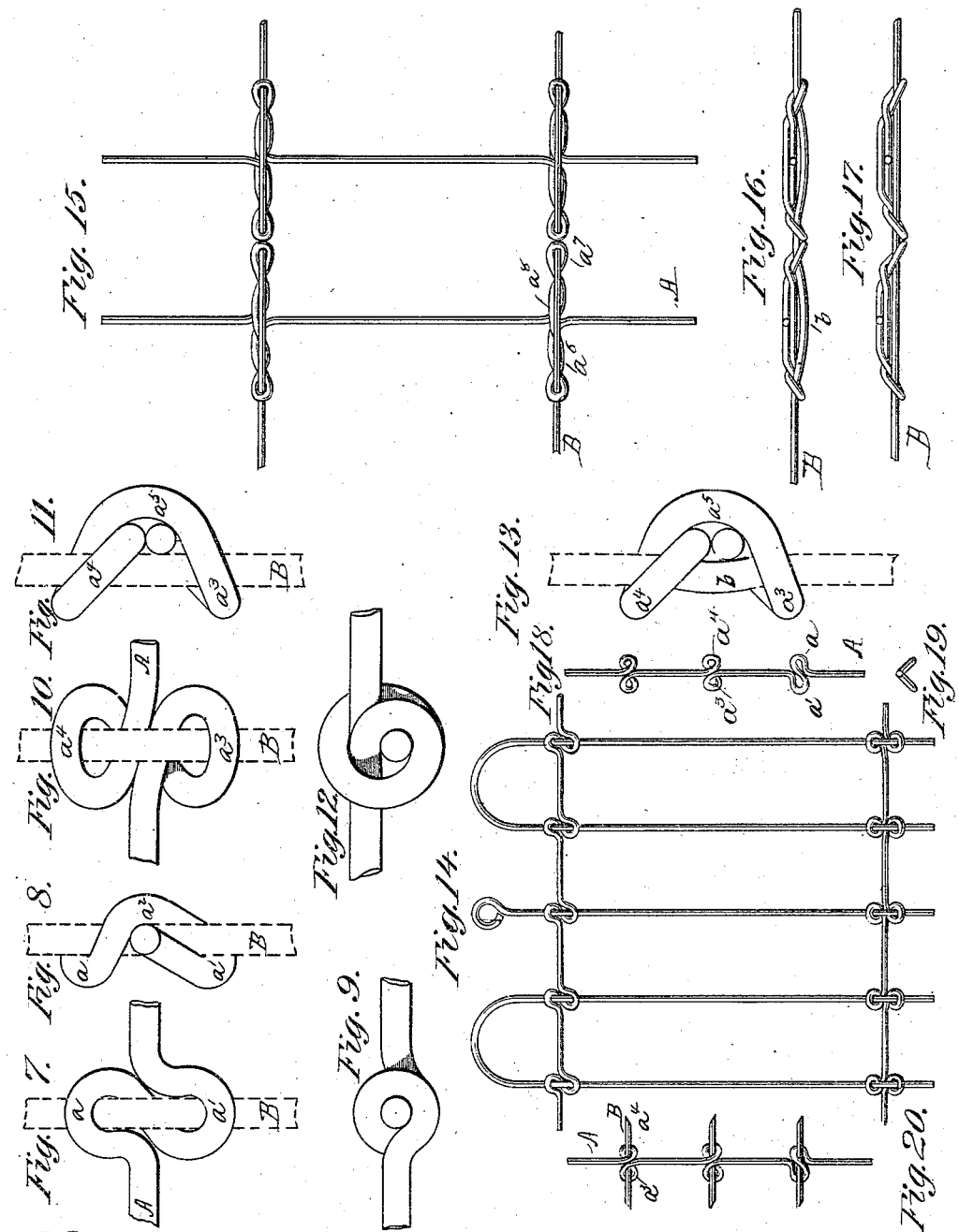

UNITED STATES PATENT OFFICE.

WUNIBALD R. BOERNER, OF CHICAGO, ILLINOIS.

WIRE-WORK.

SPECIFICATION forming part of Letters Patent No. 312,701, dated February 24, 1885.

Application filed December 22, 1883. (No model.)

*To all whom it may concern:*

Be it known that I, WUNIBALD R. BOERNER, a citizen of the United States, residing at Chicago, in the county of Cook and State of Illinois, have invented certain new and useful Improvements in Wire-Work, of which I do declare the following to be a full, clear, and exact description, reference being had to the accompanying drawings, forming part of this specification.

Figure 1:
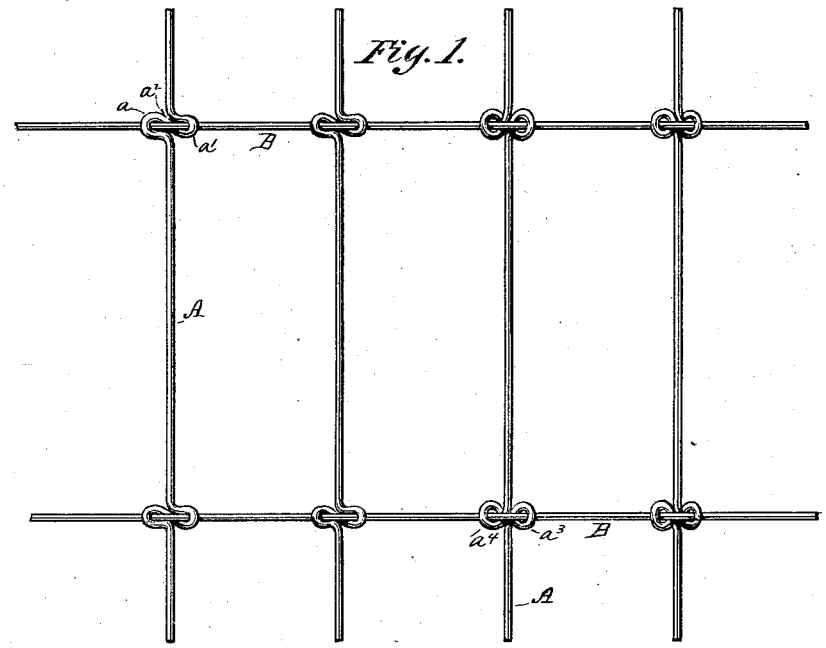
Figure 2:
Figure 3:
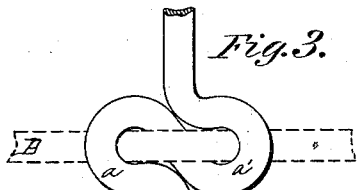
Figure 4:
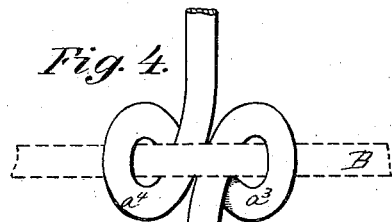
Figure 5:
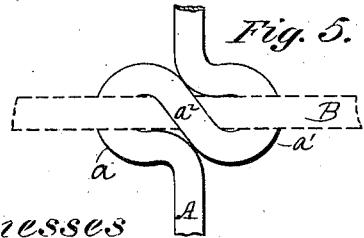
Figure 6:
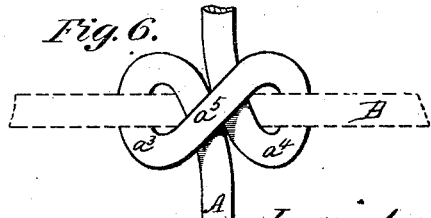

Figures 1 and 2 are respectively side and top views of several wires joined together in accordance with my invention. Figs. 3 and 5 are enlarged detail views from opposite sides of the joint shown at the left-hand side of Figs. 1 and 2, and which, for convenience of description, I call the "S-joint." Figs. 4 and 6 are enlarged detail views from opposite sides of the joint shown at the right-hand side of Figs. 1 and 2, and which I call, for convenience, the "figure-8 joint." Fig. 7 is an enlarged detail view of the S-joint, and Fig. 8 is an enlarged detail view of said joint in direction of the length of the looped wire. Fig. 9 is a detail view of the S-joint in direction of the length of the cross-wire. Fig. 10 is an enlarged detail side view of the figure-8 joint, and Fig. 11 is a detail view of said joint in direction of the length of the looped wire. Fig. 12 is a detail view of the figure-8 joint in direction of the length of the cross-wire. Fig. 13 is a view similar to Fig. 11, with the cross-wire bent or crimped. Fig. 14 is a side view of a wire fence embodying my invention. Fig. 15 is a view in side elevation of a modified form of joint which, for convenience, I designate the "double-loop" joint. Figs. 16 and 17 are views of such modified joint in direction of the length of the looped wire, the cross-wire in Fig. 16 being shown as bent. Fig. 18 is a side view of a single wire having the S-loops and the figure-8 loops therein. Fig. 19 is a detail view of the S-loop in direction of the length of the wire. Fig. 20 is a side view of a piece of barbed fence-wire made in accordance with my invention.

In the several views of the drawings, A designates the looped wire, and B denotes the cross-wire attached thereto.

In order to form the S-joint, the wire is bent to one side to form the loop $a$, and to the opposite side to form the loop $a'$, said loops being connected by the part $a^2$ of the wire, and any desired number of these loops may be formed throughout the length of the wire. The loops $a$ and $a'$ are inclined, as seen in Fig. 8 of the drawings, and through the eyes of these loops are passed the cross-wire B.

If it is desired, as is usually the case, to secure the loop-wire to the cross-wire in such manner that its position therein cannot shift, pressure will next be applied to the loops, so as to partially flatten them, and at the same time bend or crimp the cross-wire, as at $b$, to prevent its slipping through the loops. By this means a secure connection between the looped wire and the cross-wire is effected which is particularly suited to that class of work wherein no great strain is exerted upon the looped wire.

In order to form the figure-8 loop, the wire A is bent to form a complete circular loop, $a^3$, upon one side the wire, and upon the opposite side the loop $a^4$, these loops being connected together by the part $a^5$ of the wire. The ends of the loops $a^3$ and $a^4$ lie upon the same side of the connecting part $a^5$ of the wire, as by this arrangement a stronger joint is made. The loops $a^3$ and $a^4$ are inclined, as seen in Fig. 11, and through their eyes is passed the cross-wire B, which bears against the ends of the loops, and when the looped wire is to be held in fixed position upon the cross-wire pressure is applied to somewhat flatten the loops, and so bend or crimp the cross-wire as to prevent it from slipping through the loops. This construction of joint will be found particularly effective, as it will be readily seen that any increase of strain upon the looped wire serves to tighten its pressure upon the cross-wire.

In the modification shown in Figs. 15, 16, and 17 of the drawings the wire A is first bent to form the double or twisted loop $a^6$, and to form opposite said loop the double or twisted loop $a^7$, these loops being connected by the part $a^8$ of the wire. Through the outer eyes of these loops the cross-wire B will be passed, and when the looped wire is to be held in fixed position upon the cross-wire pressure will be applied to somewhat flatten the loops and crimp the cross-wire to prevent it from slipping through the loops. A joint thus formed, while very strong, has the further advantage of presenting a highly ornamental and pleasing appearance.

It will be readily seen that my present improvements are applicable to a great variety of wire-work—such, for example, as wire fences, lattice-work, bird-cages, and in fact wherever it is desired to securely unite intersecting wires.

In Fig. 14 the invention is shown as applied to a wire fence, and in Fig. 20 to a barbed wire for fence construction, the barbs being connected to the main wire by slipping them through the eyes of the loops and subjecting the loops to pressure.

The formation of the joints as above described may be effected by hand, in which event the opposite loops will be formed consecutively, or machinery may be employed, by which the opposite loops will be formed simultaneously. It will be understood, also, that the looped wire may be placed upon the market as a separate article of manufacture, the cross-wires being readily attached thereto by the consumer.

Having thus described my invention, what I claim as new, and desire to secure by Letters Patent, is—

1. As a new article of manufacture, a wire having a number of loops arranged opposite each other in pairs formed throughout its length, substantially as described.

2. As a new article of manufacture, a wire having a number of loops arranged opposite each other in pairs throughout its length, and having cross-wires passing through said loops, substantially as described.

3. As a new article of manufacture, a wire having a number of loops arranged opposite each other in pairs, said loops being inclined from the plane of the wire to permit the insertion of transverse wires, substantially as described.

4. The improved wire lattice-work, which consists of a series of main wires each having a number of loops therein arranged in pairs opposite each other, and a series of cross-wires passing through said loops, the series of main and cross wires being thus held together, substantially as described.

5. As a new article of manufacture, a wire having a number of S-shaped loops formed therein, substantially as described.

In testimony whereof I have hereunto set my hand this 19th day of December, 1883.

WUNIBALD R. BOERNER.

Witnesses:
GEO. P. FISHER, Jr.,
JAMES H. PIERCE.